Sept. 4, 1951 A. I. SEELER 2,566,859
ACCELERATOR PEDAL DEPRESSOR
Filed April 2, 1948 2 Sheets-Sheet 1

INVENTOR.
ALVAH IRVING SEELER
BY
Bosworth + Sessions
ATTORNEY.

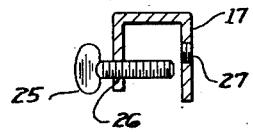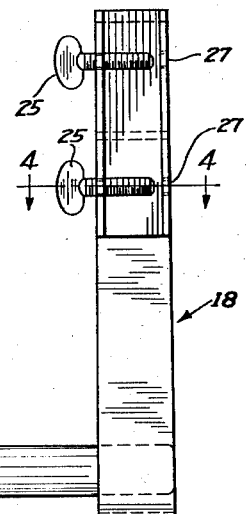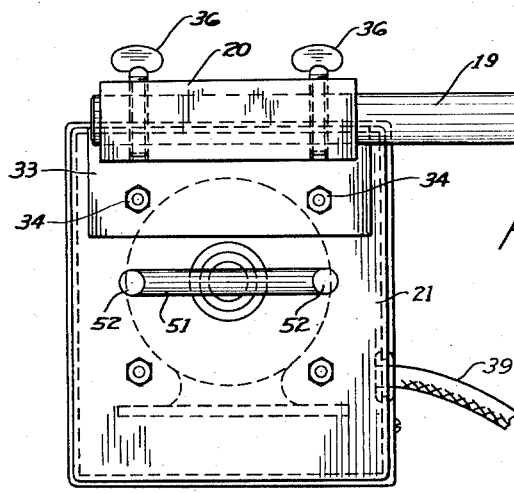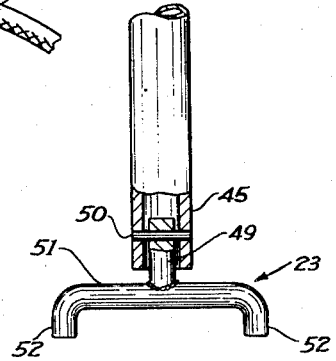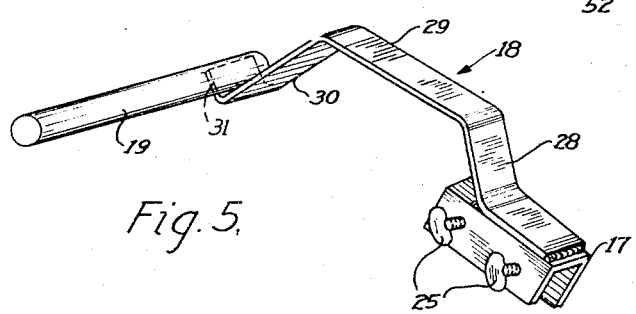

Patented Sept. 4, 1951

2,566,859

UNITED STATES PATENT OFFICE 2,566,859

ACCELERATOR PEDAL DEPRESSOR

Alvah Irving Seeler, Euclid, Ohio, assignor to The Electric Products Company, Cleveland, Ohio, a corporation of Ohio Application April 2, 1948, Serial No. 18,612

4 Claims. (Cl. 74—513)

This invention relates to a device for controlling the position of the accelerator pedal of an automotive vehicle, and is particularly adapted for use in conjunction with a chassis dynamometer.

In testing automobiles and trucks on chassis dynamometers, it is customary to operate the vehicles under various conditions of speed and load in order that a record of performance under different conditions can be obtained. The usual chassis dynamometer is controlled from a control and instrument panel positioned beside the car being tested; the dynamometer operator stands at the control panel to make his observations and to control the load applied by the dynamometer. Accordingly, in order to obtain a series of readings at different speeds and loads, it has heretofore been necessary to have another operator in the driver's seat of the vehicle being tested, whose duty is to manipulate the throttle of the car to obtain the desired speeds at the loads determined by the dynamometer operator.

The present invention has for its general object the provision of a simple remote control device whereby the throttle of an automotive vehicle can be controlled accurately and easily from a position outside of the vehicle, thus making it possible for the operator of a chassis dynamometer to control the operation of the engine of a vehicle being tested from his station at the dynamometer control and instrument panel and eliminating the need for an operator in the driver's seat. Other objects of the invention are the provision of a simple, relatively inexpensive device of this character; the provision of an accelerator pedal depressor by means of which the position of the accelerator pedal of an automobile or truck can be adjusted accurately and quickly and retained in the desired position of adjustment; the provision of an accelerator pedal depressor which can be installed quickly on any conventional automobile or truck; and the provision of a simple adjustable clamp whereby an accelerator pedal depressor can be supported from the brake pedal of a conventional automobile or truck.

Further objects and advantages of the invention will become apparent from the following description of a preferred form thereof, reference being made to the accompanying drawings; the essential characteristics are summarized in the claims.

Figure 1:
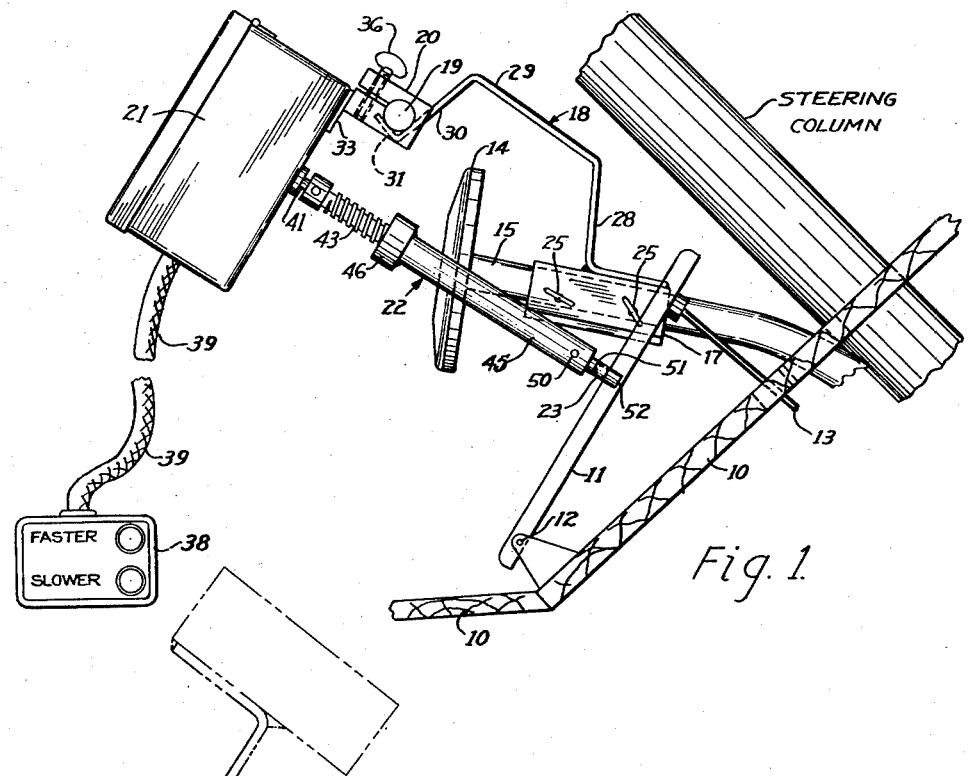
Figure 2:
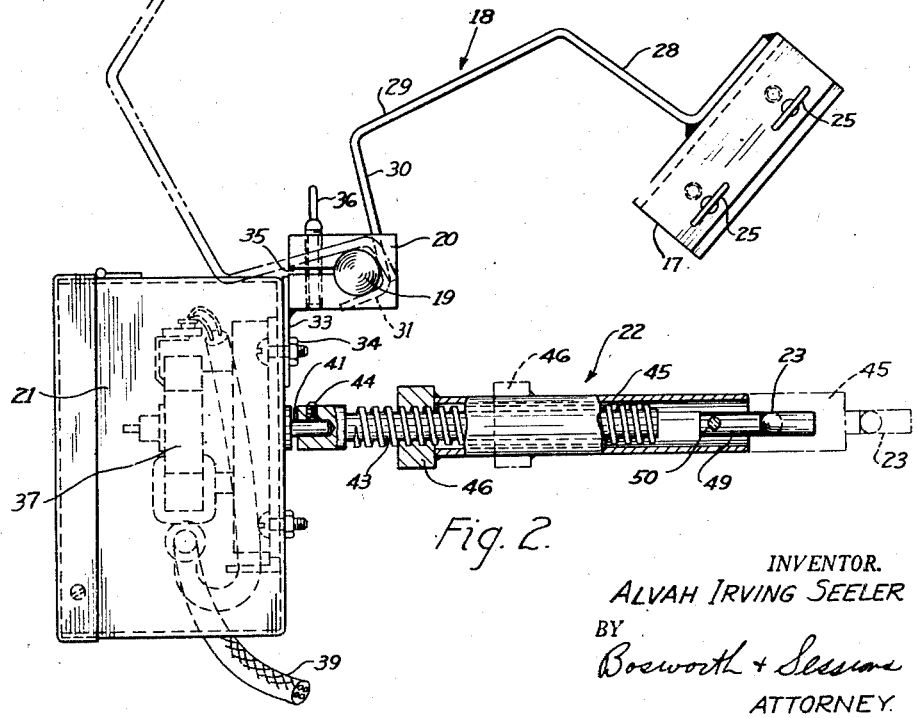

Referring to the drawings, Figure 1 illustrates a preferred form of my accelerator pedal depressor as viewed from the right when mounted in a conventional automobile; Figure 2 illustrates the device of Figure 1 removed from the automobile and drawn on an enlarged scale with parts in section; Figure 3 is a view showing the side of the device that is toward the accelerator pedal when the device is in service; Figure 4 is a sectional detail as indicated by line 4—4 of Figure 3; Figure 5 is a perspective showing the clamp and bracket for supporting the device from the brake pedal of the vehicle; and Figure 6 is a detail of the accelerator pedal engaging member of the device.

As shown particularly in Figure 1, my device is adapted to be used in conjunction with a conventional automotive vehicle having floor boards 10 and an accelerator pedal 11 pivotally supported as at 12 and provided with a rod 13 leading to the throttle linkage whereby the throttle of the vehicle engine is opened when the pedal 11 is depressed, i. e., moved about its pivot 12 toward the floor board 10. The usual brake pedal 14, which is conventionally supported on a shank 15, extends through the floor board 10 and is connected with the brake actuating linkage (not shown). As is conventional, the brake pedal is immediately to the left of the accelerator pedal.

In order to control the position of the accelerator pedal from a remote point, my accelerator pedal depressor is mounted on the pedal shank 15 by means of a clamp 17, the clamp carrying a supporting bracket 18 which carries a transversely extending rod 19. The pedal depressor proper is mounted on the rod 19 by means of a clamp 20 and comprises a housing 21; an extensible actuator indicated in general at 22 projects from the housing and is provided with an end member 23 adapted to engage the accelerator pedal 11, the actuator being arranged to be extended or retracted to depress or release the accelerator by means including a motor within the housing, and other mechanism to be described in detail below.

In order to position the housing 21 so that the actuator 22 will extend to the accelerator pedal in proper position for operation with the actuator substantially normal to the upper surface of the pedal, the mounting for the housing is made adjustable so that the device can be adapted to various makes and models of automobiles and trucks. As shown particularly in Figures 3, 4 and 5, the clamp 17 is a channel section member which is adapted to be slipped over the shank 15 of the brake pedal and secured thereto by means of thumb screws 25. The clamp can be slid along the shank 15 in order to position the housing 21 at the desired distance from the floor board, and as shown particularly in Figure 4, the channel member is provided with two pairs of threaded openings 26 and 27 making it possible for the thumb screws to be inserted into either side of the clamp to engage different types of pedal shanks.

The bracket 18 is secured to the channel member as by welding or brazing and has a portion 28 which extends upwardly away from the clamp, a portion 29 disposed at an angle to the portion 28, and a portion 30 which extends downwardly and rearwardly from the portion 29. By this arrangement, the bracket extends around the pedal 14 as shown in Figure 1 and avoids interference therewith.

The bracket 18 is disposed in substantially the same vertical plane as the shank 15 and is, of course, offset from the accelerator pedal. In order to position the housing so that the actuator 22 will be in alignment with the accelerator pedal, the housing is adjustably supported on the rod 19, which extends transversely from the bracket 18, one end of the rod being welded to the angular end portion 31 of the bracket. The housing, as previously noted, is supported on the rod 19 by the clamp 20 which is welded to the plate 33, the plate being secured to the housing as by nuts and bolts 34.

As shown in Figure 2, the clamp 20 has a circular recess to receive the rod 19, and is split as at 35 to give it resilience. The thumb screws 36 are employed to tighten the clamp on the rod 19. By this arrangement, the housing 21 can be supported in the desired position with respect to the accelerator pedal 11, inasmuch as the clamp 20 may be slid along the rod 19 to obtain the desired lateral positioning of the housing with respect to the accelerator pedal, and may be rotated on the round rod 19 to locate the housing so that the actuator 22 will extend toward the accelerator pedal in a direction substantially normal thereto as shown in Figure 1. Thus, the device may be adapted to any conventional automobile or truck, and the housing located in the proper position by means of the various adjustments described above.

In order to advance and retract the actuator 22, I preferably employ the mechanism shown best in Figure 2, and comprising a small reversible electric motor 37 disposed within the housing 21. The operation of the motor may be controlled by a conventional push button control 38, connected to the motor by cable 39, and arranged so that the motor can be operated in either direction. The motor incorporates a reduction gear of any conventional design interposed between the motor armature and the shaft 41 which projects out of the housing 21. The actuator 22 is made up of a screw 43 having a recess in one end thereof into which the shaft 41 projects, the shaft and screw 43 being secured together by a set screw 44. A sleeve 45 is telescoped over the screw and is in threaded engagement with the screw through the nut 46 which is secured to the sleeve as by welding.

The member 23, which engages the accelerator pedal, is secured to the end of the sleeve 45 opposite the nut 46; this member is made up of a central member 49 extending within the sleeve 45 and secured thereto by a pin 50, a transverse portion 51 and downwardly turned leg portions 52. The transverse portion 51 engages the upper surface of the accelerator pedal, and the end portions 52 are disposed on either side thereof. These end portions hold the member 23 against rotation, and thus prevent rotation of the sleeve 45. Accordingly, when the screw 43 is rotated in one direction, the sleeve is extended away from the housing and the accelerator pedal depressed and the throttle opened (a partially extended position of the actuator is shown in broken lines in Figure 2); when the screw is rotated in the opposite direction, the sleeve is retracted, the usual spring causes the accelerator pedal to remain in contact with the member 23 and thus the throttle is closed.

In use, the operator secures the clamp 17 to the pedal shank 15, adjusts the clamp 20 to position the housing so that the end 23 of the actuator 22 is disposed in correct relation to the accelerator pedal 11. Then, the operation of the engine of the vehicle being tested can be controlled by the push button control 38, which is disposed within convenient reach of the operator at his station at the dynamometer control panel. The gear reduction and screw drive makes fine and accurate adjustment of the position of the accelerator pedal easy to accomplish. Because of the screw and nut means for extending the actuator 22, the actuator remains in adjusted position in spite of vibrations of the vehicle engine, thus accurate readings can be obtained and the vehicle engine can be correctly adjusted.

Various changes and modifications may be made in the preferred form of the invention disclosed herein without departing from the spirit and scope thereof. Accordingly, it is to be understood that my patent is not limited to the foregoing disclosure, or in any manner other than by the scope of the appended claims.

I claim:

1. A device of the character described comprising a clamp adapted to be secured to the shank of the brake pedal of an automotive vehicle, a bracket secured to the clamp and adapted to extend upwardly away from said shank, a rod projecting transversely from the bracket, a housing adjustably supported on said rod, an actuator extending from said housing and adapted to engage the accelerator pedal of the vehicle, and a motor in said housing adapted to extend and retract said actuator to depress and release said accelerator pedal.

2. A device of the character described comprising a clamp adapted to be secured to the shank of the brake pedal of an automotive vehicle, a bracket secured to the clamp, a rod projecting transversely from the bracket, a housing adjustably supported on said rod, an actuator extending from said housing and adapted to engage the accelerator pedal of the vehicle, a motor in said housing adapted to extend and retract said actuator to depress and release said accelerator pedal, and remote control means for said motor.

3. A device of the character described comprising a clamp adapted to be secured to the shank of the brake pedal of an automotive vehicle, a bracket secured to the clamp, a rod projecting transversely from the bracket, a housing adjustably supported on said rod, a reversible electric motor in said housing, remote control means for said motor, and an extensible actuator extending from said housing and adapted to engage the accelerator pedal of the vehicle, said actuator comprising a screw and a sleeve telescoped over said screw and having a nut secured thereto and in threaded engagement with said screw, one of said elements being rotatable by said motor, the other of said elements having a forked end portion adapted to engage the accelerator pedal of the vehicle and to be prevented from rotation thereby, whereby operation of the motor in one direction causes said actuator to be extended to depress said accelerator pedal and rotation in the other direction causes said actuator to be retracted to release said pedal.

4. A device of the character described comprising a housing, a reversible electric motor within the housing, an actuator projecting from the housing and arranged to be extended and retracted by said motor and having an end portion adapted to engage the accelerator pedal of an automotive vehicle, adjustable means adapted to be secured to the brake pedal of the vehicle for supporting said housing in such a position that the end portion of said actuator engages the accelerator pedal with the actuator disposed substantially normal to the upper surface of the accelerator pedal, and means for controlling said motor from a point outside of said vehicle.

ALVAH IRVING SEELER.

REFERENCES CITED

The following references are of record in the file of this patent:

UNITED STATES PATENTS

| Number | Name | Date |
| --- | --- | --- |
| 696,901 | Fairchild | Apr. 1, 1902 |
| 1,500,365 | Carlton | July 8, 1924 |
| 1,790,851 | Weaver | Feb. 3, 1931 |
| 2,202,585 | Jordan | May 28, 1940 |
| 2,270,735 | Knudsen | Jan. 20, 1942 |
| 2,367,033 | Lear | Jan. 9, 1945 |
| 2,400,224 | Christensen et al. | May 14, 1946 |
| 2,403,092 | Lear | July 2, 1946 |
| 2,422,495 | Morrow | June 17, 1947 |